United States Patent
Kamity et al.

(10) Patent No.: US 7,523,452 B1
(45) Date of Patent: Apr. 21, 2009

(54) METHOD AND APPARATUS FOR CREATING AND USING A DOWNLOAD PACKAGE TO MODIFY SOFTWARE CONFIGURATION OF A STORAGE SYSTEM

(75) Inventors: Kiran Kamity, Sunnyvale, CA (US); Dan H. Gilson, III, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 770 days.

(21) Appl. No.: 11/006,875

(22) Filed: Dec. 7, 2004

(51) Int. Cl.
*G06F 9/45* (2006.01)
(52) U.S. Cl. .................................. 717/178
(58) Field of Classification Search ............. 717/178
See application file for complete search history.

(56) References Cited

U.S. PATENT DOCUMENTS

| | | | |
|---|---|---|---|
| 7,400,997 B2 * | 7/2008 | Edson | 702/122 |
| 2006/0123410 A1 * | 6/2006 | Kapoor | 717/174 |
| 2007/0220032 A1 * | 9/2007 | Kapoor et al. | 707/102 |

* cited by examiner

*Primary Examiner*—John Chavis
(74) *Attorney, Agent, or Firm*—Perkins Coie

(57) ABSTRACT

A method of modifying the software configuration of a storage system includes receiving a download package at the storage system via a network connection. The download package is for use in performing a software installation process in the storage system and includes an archive of files and a metadata entity appended to the archive. The metadata entity includes a first set of metadata. The method further includes using the first set of metadata in the storage system to perform a set of preliminary checks for the software installation process.

40 Claims, 8 Drawing Sheets

METHOD AND APPARATUS FOR CREATING AND USING A DOWNLOAD PACKAGE TO MODIFY SOFTWARE CONFIGURATION OF A STORAGE SYSTEM

FIELD OF THE INVENTION

At least one embodiment of the present invention pertains to modifying the software configuration of a processing system, and more particularly, to upgrading the software configuration of a storage system by using a download package.

BACKGROUND

A storage server is a special-purpose processing system that is used to store and retrieve data on behalf of one or more client processing systems ("clients"). Storage servers are commonly used for a variety of purposes, such as providing multiple users with access to shared data and backing up critical data (e.g., by data mirroring).

A file server is an example of a storage server, which operates on behalf of one or more clients to store and manage shared files in a set of mass storage devices, such as magnetic or optical disks or tapes. The mass storage devices may be organized into one or more volumes of a Redundant Array of Inexpensive Disks (RAID). A file server which is designed as an appliance for use in a network attached storage (NAS) environment is sometimes referred to as "filer"; enterprise-level filers are made by Network Appliance, Inc. of Sunnyvale, Calif. Another type of storage server is a device which provides clients with block-level access to stored data, rather than file-level access. This type of storage server is often used to implement storage area networks (SANs). Other storage servers are capable of providing clients with either file-level access or block-level access. Certain Filers made by Network Appliance have this capability.

With storage servers, as with most other types of modern processing systems, it is desirable to be able to install new software or to upgrade the existing software in a way that is convenient for the user. A well-known way to install software in a conventional processing system is to insert a removable storage medium that contains the software (e.g., a disk, CD-ROM, DVD or the like) into the processing system and run a conventional installer program. Another popular method is to download the software from a remote server over a network, such as the Internet. The latter method is often more convenient, especially if the software is updated frequently.

With a complex processing system, particularly an enterprise-level storage system, it is common for software upgrades to be produced frequently. Therefore, the network download approach is generally the preferred method of installing new or updated software in such systems. However, current download techniques have a number of shortcomings.

For example, one known process for upgrading software in an enterprise-level filer is as follows. First, the customer/user (hereinafter "user") downloads, from a remote server of the manufacturer, a "download package" that consists of archived and compressed files (e.g., tar or zip) containing the upgrade. The package is then uncompressed and un-archived on the filer, either manually or automatically in response to a command. The user then inputs a command to the filer to copy the new software into non-volatile memory (e.g., Compact Flash) and the hard-drive boot sectors of the filer. Finally, the user reboots the filer to complete the process.

Although this process generally works well, it has several limitations. First, the user has to go through multiple steps. This is not only laborious, but there is also a high possibility for user error. Also, the package format is too simple to involve any additional system-specific data. Therefore, no checks can be performed on the package before installing it. So, if the user is inadvertently trying to install a package that is not meant for the particular platform being used, the current process will not stop him from doing so. This could result in damage to the filer. Furthermore, the files in the package are not individually checksummed. Consequently, there is a chance that accidental/voluntary bit flips can go unnoticed. In addition, if the user is performing a procedure that requires a special command, such as a software downgrade, there is no ability to inform the user that the command is required. Furthermore, there is no file locking during installation of the package contents, which could lead to synchronization issues. Also, there is no mechanism to assure the user that the package is in fact made by the manufacturer of the filer.

There are download package managers available which may address some of these issues, such as Red Hat's RPM and Debian's apt_get. However, these are user-space programs, which are difficult to port to the kernel-space such as used in a Filer or other enterprise-level storage system. Moreover, it is difficult if not impossible to tune these package managers to the specific implementation and requirements of a particular storage system.

What is needed, therefore, is an improved software download technique and mechanism which overcomes these limitations.

SUMMARY OF THE INVENTION

The present invention includes a method which includes receiving a download package at a storage system via a network connection. The download package is for use in performing a software installation process in the storage system and includes an archive of files and a metadata entity appended to the archive. The metadata entity includes a first set of metadata. The method further includes using the first set of metadata in the storage system to perform a set of preliminary checks for the software installation process.

The present invention further includes a storage system which performs such a method.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for modifying the software configuration of a storage system by using a download package are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not necessarily mutually exclusive. For example, a feature, structure, act, etc. described in one embodiment may also be included in other embodiments. Thus, the present invention can include a variety of combinations and/or integrations of the embodiments described herein.

As described in detailed below, the technique introduced herein includes receiving a download package at a processing system such as a storage system. The download package includes a compressed archive of files to be installed and a set of administrative data ("metadata") appended to the compressed archive. The metadata are used by the storage system to perform a set of preliminary checks for the software installation process.

The metadata includes all of the information needed about the download package for purposes of installation. The metadata can be used, for example, to determine whether the user is trying to install a package that is inappropriate for the current platform, and if so, to warn the user accordingly. In addition, the metadata enables checksumming of individual files within the package, file locking, and can include a digital signature to allow the authenticity of the package to be verified.

In general, each download package has its own metadata depending on the nature of the software to be installed (firmware, kernel, diagnostics, remote LAN manager, etc.). A package creation process creates the metadata to have the appropriate set of parameters for the package under consideration and incorporates the metadata into the package. The package is distributed to the user (e.g., from a web site). When the user tries to install the package, software within the operating system of the storage system queries the package to obtain the values of various metadata parameters, and installs the package (or not) accordingly.

Figure 1:
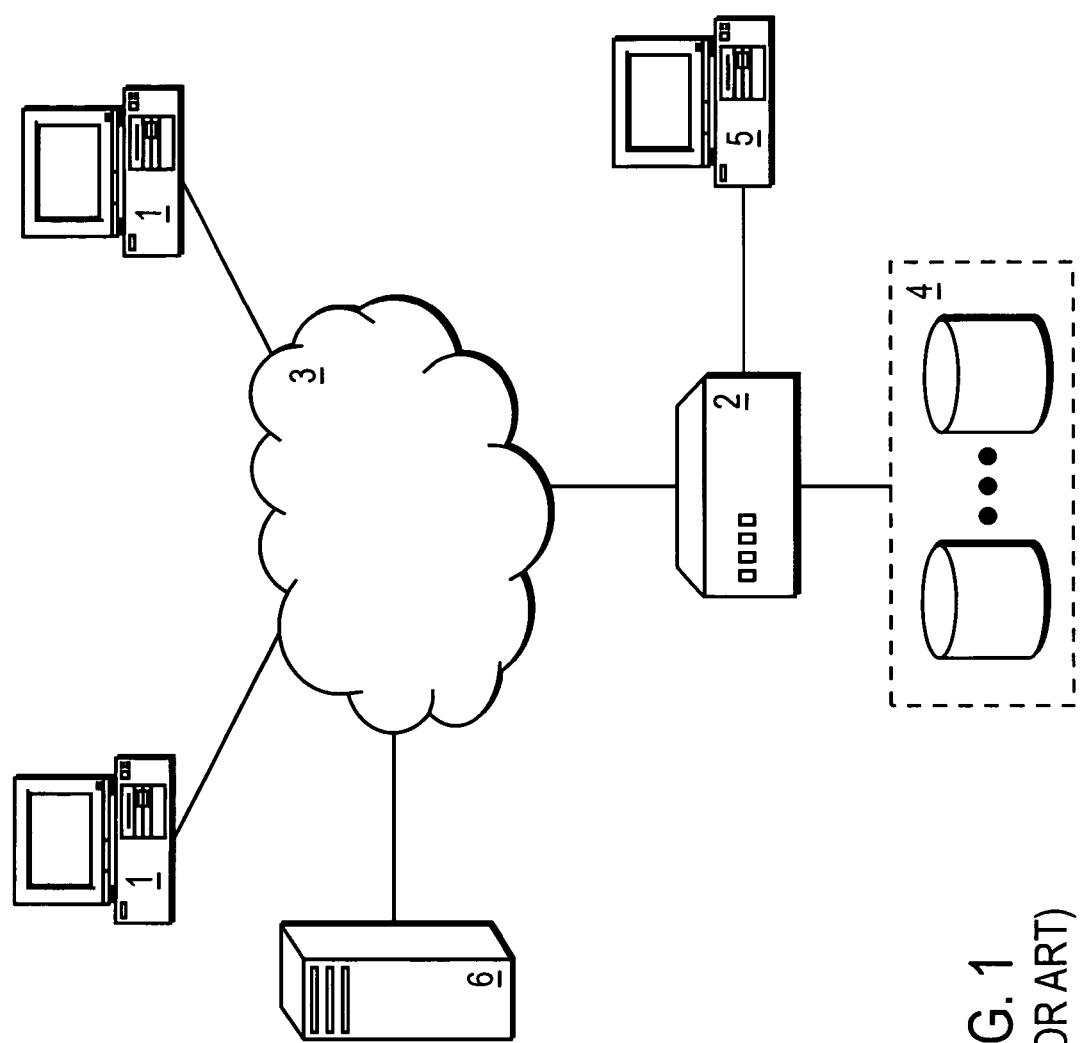
FIG. 1 illustrates a simple example of a network environment in which the present invention can be implemented.

FIG. 1 shows a simple example of a network environment which incorporates a storage server 2. The storage server 2 may be, for example, a Filer, a block-based (SAN) storage server, or a device which provides both file-based access and block-based access to data. Note, however, that the download technique introduced herein is not limited to use in storage servers. For example, the technique can be adapted for use in other types of storage systems and other types of processing systems.

The storage server 2 in FIG. 1 is coupled locally to a storage subsystem 4 which includes a set of mass storage devices, and to a set of clients 1 through a network 3. The network 3 may be, for example, a local area network (LAN), a wide area network (WAN), the Internet, or essentially any other type of network or combination of networks. Each of the clients 1 may be, for example, a conventional personal computer (PC), workstation, or the like. The storage subsystem 4 is managed by the file server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data.

Although not illustrated as such, the storage server 2 may have a distributed architecture; for example, it may include a separate N-("network") blade and D-(disk) blade (not shown). In such an embodiment, the N-blade is used to communicate with clients 1, while the D-blade includes the file system functionality and is used to communicate with the storage subsystem 4. The N-blade and D-blade communicate with each other using an internal protocol. Alternatively, the storage server 2 may have an integrated architecture, where the network and data components are all contained in a single box. The storage server 2 further may be coupled through a switching fabric to other similar storage servers (not shown) which have their own local storage subsystems. In this way, all of the storage subsystems can form a single storage pool, to which any client of any of the file servers has access.

And administrative console 5 is coupled to the storage server 2 and can be used to control perform various operations on the storage server 2, including the software download/installation process introduced herein. In addition, a download server 6 is coupled to the network 3. The download package, including metadata as described herein, is typically obtained by the storage server 2 from the download server 6 via the network 3.

Figure 2:
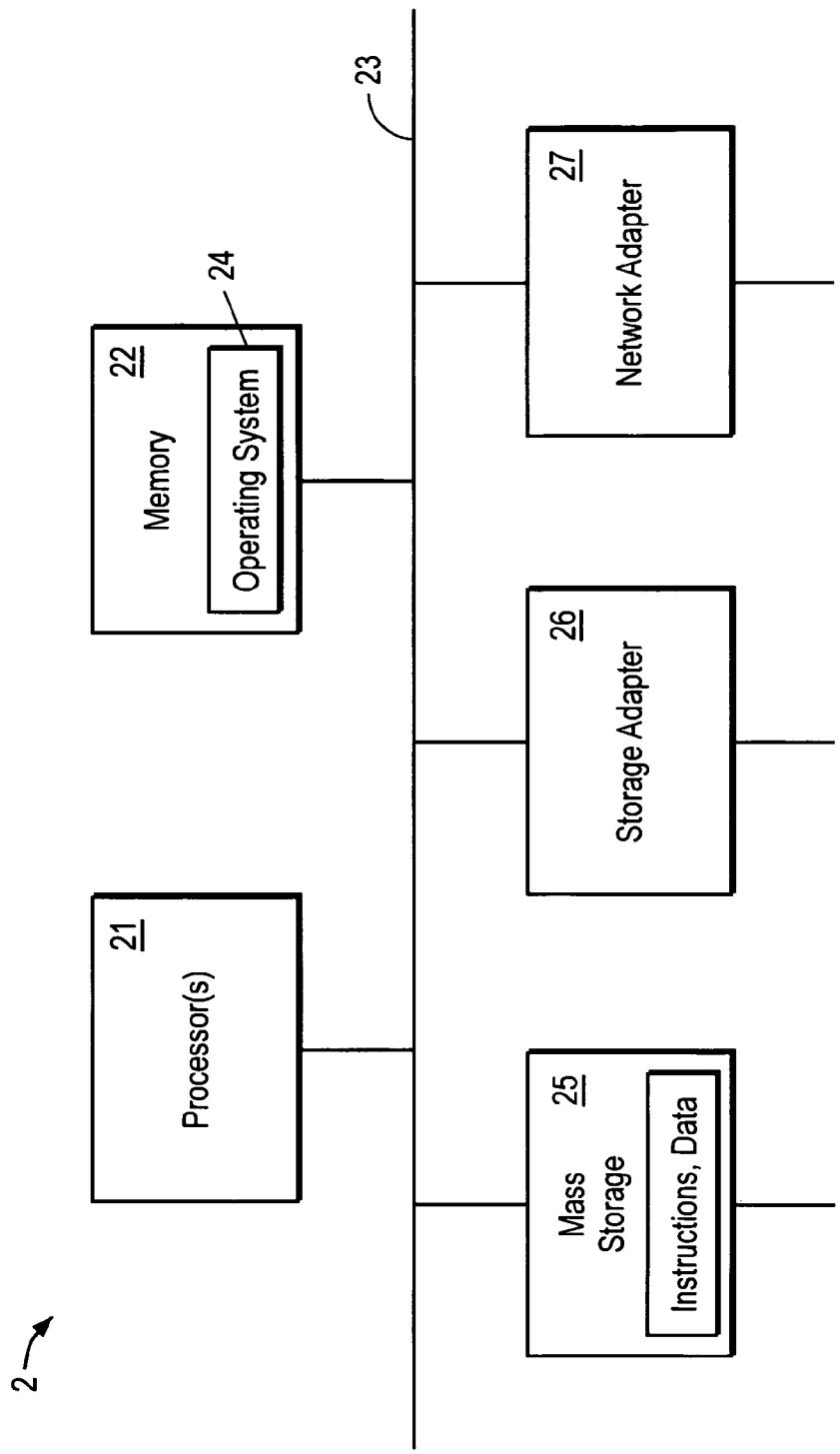
FIG. 2 is a high-level block diagram showing the architecture of a storage server.

FIG. 2 is a high-level block diagram showing the architecture of the storage server 2, according to certain embodiments of the invention (certain standard and well-known components which are not germane to the present invention may not be shown). The storage server 2 includes one or more processors 21 and memory 22 coupled to a bus system 23. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the file server 2 and, thus, control the overall operation of the file server 2. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 is or includes the main memory of the file server 2. Memory 22 represents any form of random access memory (RAM), read-only memory (ROM), flash memory, or the like, or a combination of such devices. Memory 22 stores, among other things, the operating system 24 of the file server 2.

Also connected to the processors 21 through the bus system 23 are one or more internal mass storage devices 25, a storage adapter 26 and a network adapter 27. Internal mass storage devices 25 may be or include any conventional medium for storing large volumes of data in a non-volatile manner, such as one or more magnetic or optical based disks. The storage adapter 26 allows the storage server 2 to access the storage subsystem 4 and may be, for example, a Fibre Channel adapter or a SCSI adapter. The network adapter 27 provides the storage server 2 with the ability to communicate with remote devices, such as the clients 1, over a network and may be, for example, an Ethernet adapter.

Figure 3:
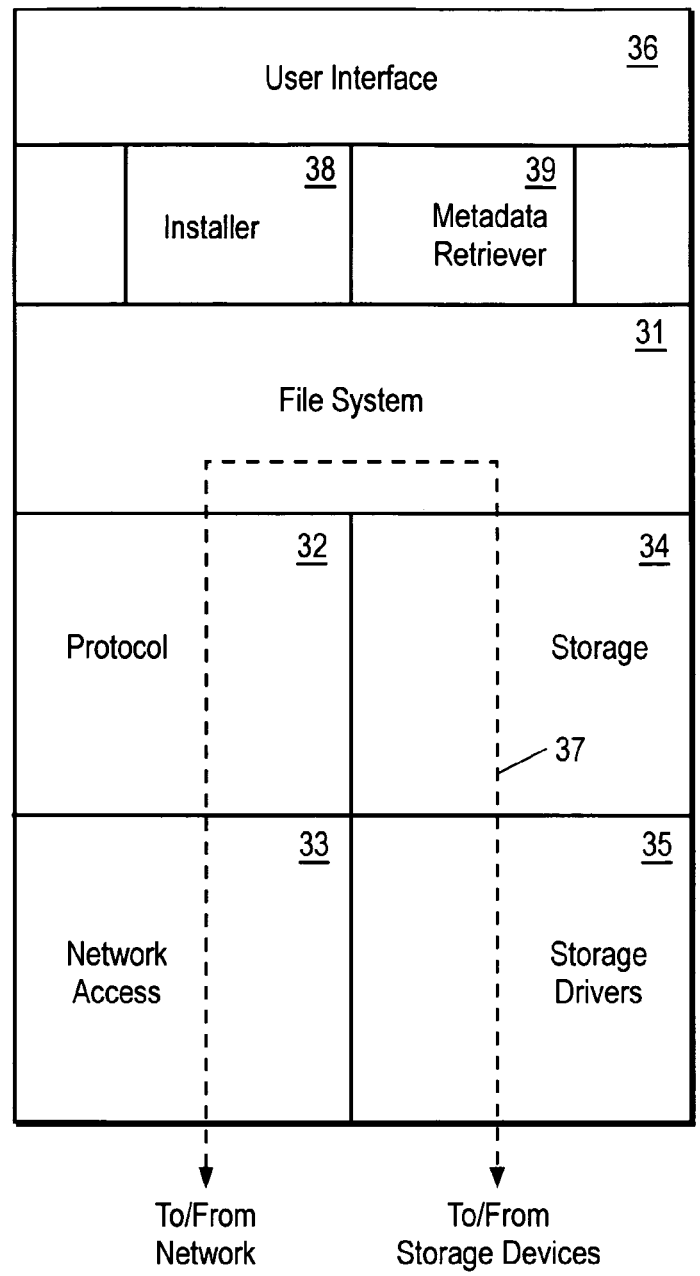
FIG. 3 shows an example of the operating system of the storage server.

FIG. 3 shows an example of the operating system 24 of the storage server 2, according to an embodiment of the invention in which the storage server 2 is a file server (e.g., a filer). As shown, the operating system 24 includes several modules, or "layers". These layers include a file system 31. The file system 31 is application-layer software that keeps track of the directory structure (hierarchy) of the data stored in the storage subsystem 4 and manages read/write operations on the data (i.e., executes read/write operations on the disks in response to client requests). Logically "under" the file system 31, on the network side the operating system 24 also includes a protocol layer 32 and an associated network access layer 33, to allow the file server 2 to communicate over the network 3 (e.g., with clients 1). The protocol 32 layer implements various higher-level network protocols, such as Network File System (NFS), Common Internet File System (CIFS), Hypertext Transfer Protocol (HTTP) and Transmission Control Protocol/Internet Protocol (TCP/IP). The network access layer 143 includes one or more drivers which implement one or more lower-level protocols to communicate over the network, such as Ethernet.

Also logically under the file system 31, on the storage side the operating system 24 includes a storage access layer 34 and an associated storage driver layer 35, to allow the file server 2 to communicate with the storage subsystem 4. The storage access layer 34 implements a higher-level disk storage protocol, such as RAID, while the storage driver layer 35 implements a lower-level storage device access protocol, such as Fibre Channel Protocol (FCP) or SCSI. To facilitate description, it is henceforth assumed herein that the storage access layer 34 implements a RAID protocol, such as RAID-4, and therefore may alternatively be referred to as RAID layer 34.

Also shown in FIG. 3 is the path 37 of data flow, through the operating system 24, associated with a read or write operation.

Logically above the file system 31, the operating system 24 has an application layer that includes various modules, including a software installer 38 and a metadata retriever 39. The installer 38 is responsible for carrying out the overall installation process using a received download package. The metadata retriever 39 is called by the installer 38 at the appropriate time prior to actual installation and is responsible for parsing and retrieving the metadata in the download package.

Above the application layer is a user interface (UI) layer 36, by which a user (e.g., network administrator) can control and/or access functions of the storage server 2. The UI layer 36 may implement a command line interface, a graphical user interface (GUI), or both.

Figure 4A:
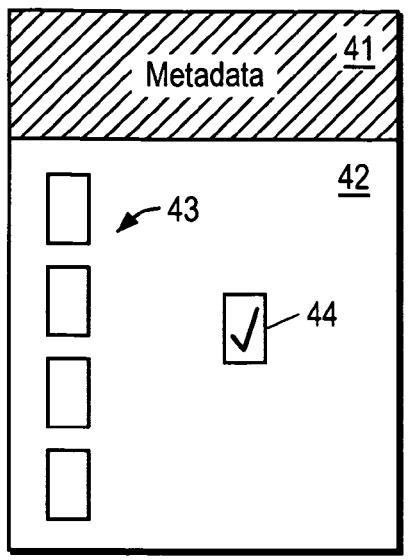
FIGS. 4A, 4B and 4C show various possible format for a download package.
Figure 4B:
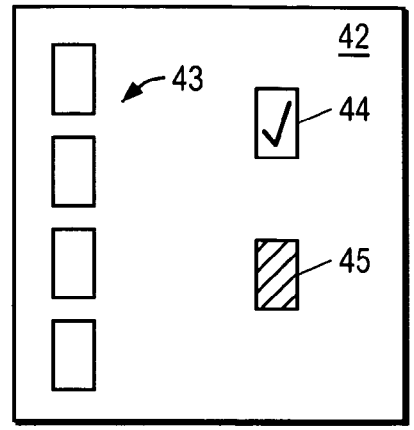
Figure 4C:
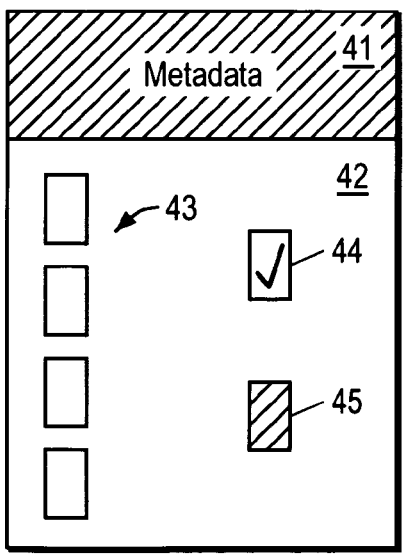

The download package may have any of various formats, as described now with reference to FIGS. 4A, 4B and 4C. FIG. 4A shows one possible format of a download package 40, in which a metadata entity 41 (containing the metadata) is appended to a compressed archive 42. This format may be represented in shorthand as {Metadata}+{compress[Archive (Files)]}. The archive 42 includes a number of files 43 representing the software to be installed as well as a checksum file 44. The checksum file 44 includes a checksum for each of the other files 43 in the archive 42. As described further below, the metadata entity 41 includes a field containing the actual metadata as well as certain other fields, such as one or more checksums and a digital signature of the download package 40. An advantage of this format is that it allows for checksums, digital signatures, etc. In addition, the metadata are available to the installer before the archive file is decompressed or un-archived, which improve the speed of installation.

A second possible format of download package is shown in FIG. 4B. In this format, the metadata is included as a separate file 45 in the archive 42 prior to compression. This format can be represented in shorthand as {compress[Archive(Files+ Metadata)]}. An advantage of this format is that it can be read by an older version of the installer 38 that is not designed to read appended metadata. However, the package 40 must be decompressed before any of the metadata can be read, which makes the overall installation process more time-consuming.

A third possible format of download package is shown in FIG. 4C. In this format, the metadata is included in the archive 42 as a file 45 prior to compression, and then an additional metadata entity 41 is appended to the compressed archive 42 after compression. This format can be represented in shorthand as {Metadata+compress[Archive(Files+Metadata)]}. The metadata 45 inside the archive 42 may be the same data as the metadata in the appended metadata entity 41, or they may be different metadata. This format can be used, for example, to facilitate certain metadata checks (i.e., by using the appended metadata) before the package is decompressed (e.g., for speed reasons). Also, this format can be used to facilitate an easy migration from a backward-compatible package format (no metadata appended to the package) to a format that is more time-optimal (metadata appended to the package). For example, initially the former format can be used, until all users are known to have an installer capable of reading the appended metadata. At that point, the transition can be made to the more optimal package format (i.e., with appended metadata).

In a fourth possible format, compression is only applied to the archive 42 after the metadata entity 41 has been appended to the archive 42. This format may be represented in shorthand as {compress[Metadata+Archive(files)]}.

The nature and format of the metadata will now be described greater detail. A metadata entity as described above includes one or more metadata parameters. In an embodiment of the invention, each metadata parameter requires the following data items to represent and retrieve it unambiguously:

1. Metadata parameter name:
Param_Name
A string
2. Metadata parameter type:
Param_Type
An enumerator (enum) enabling choice between int (integer), char (character), string, double and float.
typedef enum {INT=1, CHAR, STRING, DOUBLE, FLOAT} Param_Type
3. Is parameter an array?
Is_Param_Array
TRUE or FALSE enum typedef enum {TRUE, FALSE} Is_Param_Array
4. Array length, (if Is_Param_Array is FALSE, Array_Length is always 1)
Array_Length
An integer
5. Metadata value(s)
Param_Value
A list of values if it is an array In one embodiment, all of the data items are converted to strings, concatenated and separated from their neighbors by semi-colons (;). The end of a metadata parameter is represented with a linefeed (\n). The following is an example of a string that can be used to represent the version parameter for an operating system (namely, the ONTAP operating system of Network Appliance):

Param_Name="ONTAP version"
    Param_Type="3"—To denote a string
    Is_Param_Array="1"—To denote FALSE
    Array_Length="1"
    Param_Value="scrimshaw.1"
    Data item delimiter=';'—semicolon
    Metadata parameter delimiter='\n'—linefeed Therefore, the version parameter in this example is represented as:

ONTAP version;3;1;1;scrimshaw.1<\n>

This string is retrieved and parsed by the metadata retriever 39 when called by the installer 38.

Any of various possible approaches can be used to combine multiple metadata parameters within a metadata entity and then retrieve them during an installation process. One approach is the sequential approach. In the sequential approach, all metadata parameters are concatenated into a large string with no sorting. In that case, to retrieve the metadata, the metadata retriever 39 can simply separate the string into individual metadata parameters, place all of the metadata parameters in an array, and then do a sequential search on the array by Param_Name to retrieve the desired metadata parameter.

Another approach is to use hashing. In an example of the hashing approach, a hashing algorithm can be used to hash Param_Name to an integer. Each metadata parameter is then placed into an array, where the integer is used as the index to the array for each parameter. All of the array elements are then concatenated into a string. For retrieval, the metadata retriever 39 separates all of the individual metadata parameters, places them into an array by using the same hashing algorithm to hash Param_Name to an integer, and then retrieves the desired metadata parameter using this integer as the index into the array.

A third possible approach is to use a binary tree. For example, in this approach the metadata parameters are partially sorted based on Param_Name. The parameters are then arranged into a binary tree structure, and all elements of the tree are then concatenated into a large string. For retrieval, the metadata retriever 39 separates individual metadata parameters, arranges them back into the same binary tree, and then retrieves the desired metadata parameter based on a search on Param_Name.

A fourth possible approaches to use extensible markup language (XML). In this approach, all data are arranged using XML, by designing customized tags specific to the metadata. For retrieval, an XML processor is used (such as DOM or a custom-designed processor) to retrieve the metadata.

Security is an important concern in the download and installation process. Accordingly, the technique introduced herein can include several layers of security. First, during creation of the download package, all files in the archive are checksummed, to protect against inadvertent bit flips. The checksums of all of the files are included in a separate checksum file, which is included in the archive as mentioned above. Next, the checksum file itself is checksummed, and the checksum of the checksum file is stored in a field in the metadata entity. Further, the metadata entity is checksummed, and its checksum is then added to the metadata entity. Finally, the download package is provided with a digital signature to allow its authenticity to verified, and the digital signature is added to the metadata entity. Note that it is not necessary to use all of these levels of security in a given implementation, although it is considered desirable to do so.

Figure 5:
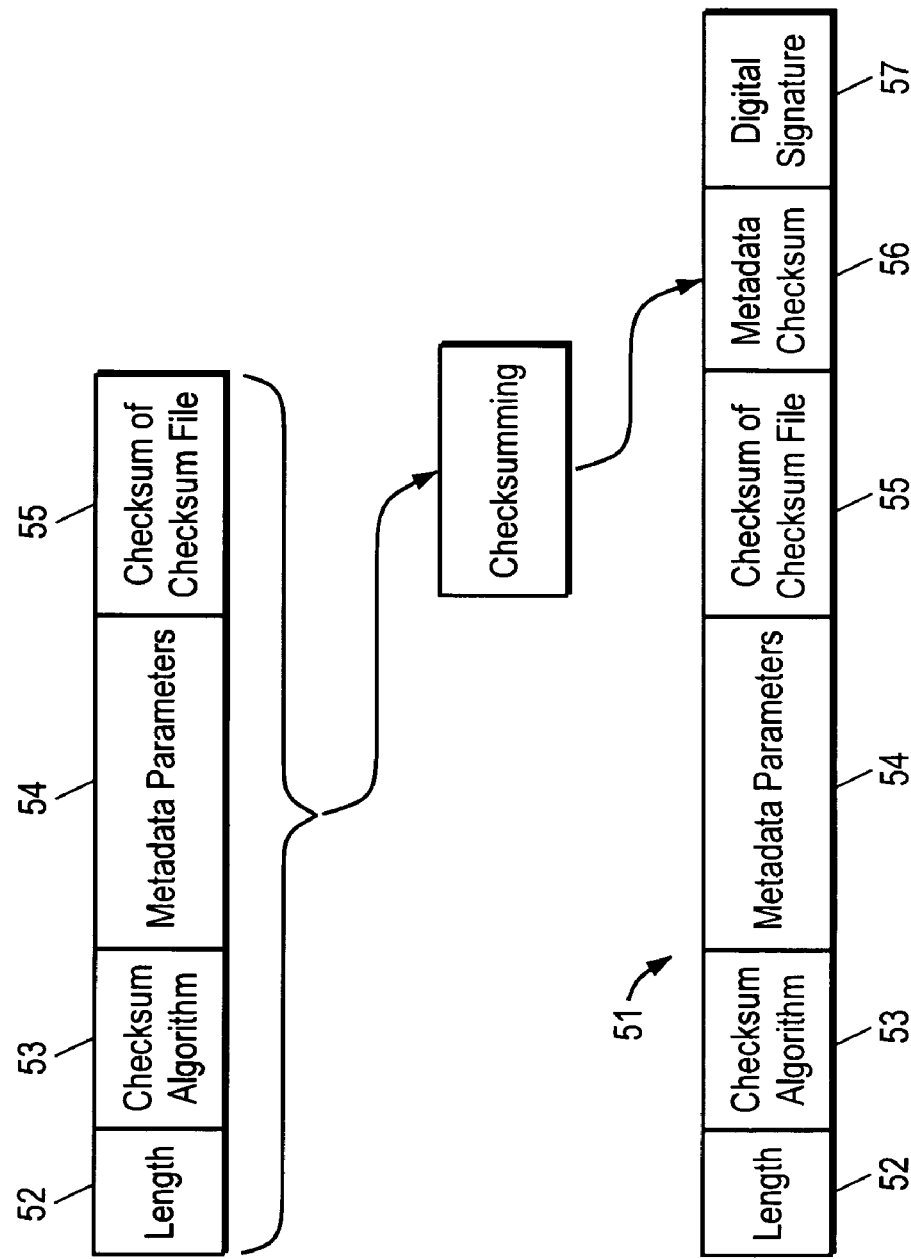
FIG. 5 shows an example of the format of a metadata entity.

FIG. 5 shows the format of a metadata entity and how it is created, according to an embodiment of the invention. Initially, during creation of the download package, one or more metadata parameters are combined into a concatenated parameter string 54 in the manner described above. The checksum 55 of the checksum file is then appended to the metadata entity 51 after the metadata parameter string 54, and an identifier 53 which identifies the checksum algorithm is then appended to the metadata entity 51 before the metadata parameter string 54. This algorithm identifier 53 is used by the installer 38 during installation to select the correct algorithm to use for verifying the metadata checksum 56. A string 52 indicating the length in bytes of the metadata parameter string 54 is then appended to the metadata entity 51 before the checksum indicator 53. Next, the metadata entity 51 is checksummed using the aforementioned algorithm, and the resulting metadata checksum 56 is added to the metadata entity 51 after the checksum 55 of the checksum file. Finally, a digital signature 57 for authenticating the download package is added to the metadata entity 51 after the metadata checksum 56.

To create each of the above-mentioned checksums, any of various checksumming algorithm can be used. Examples of checksumming algorithms that can be used are MD5 and SHA-1.

The metadata included in a download package are typically administrative data that are used by the installer 38 to guide, control and/or monitor the installation process. There are many different types of parameters that may be included in the metadata, some examples of which are the following:

1. Installer version
    2. Download Package type (e.g., Kernel, firmware, diagnostic, network cache)
    3. Metadata version
    4. CPU Instruction Set Architecture (e.g., MIPS, x86) (to prevent installation of the package on an incompatible architecture)
    5. Download Package author
    6. Timestamp (date and time when the package was created)
    7. Data archiving format (e.g., tar/archiving)
    8. Data compression format (e.g., bzip/gzip.)
    9. Data file checksumming algorithm (e.g., MD5, SHA-1)
    10. Checksum file location Many other parameters can be included in the metadata. The nature and number of these other parameters will depend upon the nature and purpose of the software contained in the download package. As one example, in an operating system upgrade package, another metadata parameter can indicate the particular hardware platforms and/or configurations (e.g., filer model names) on which the software upgrade will work. As another example, a metadata parameter may include a list of hardware adapters (e.g., host bus adapters, PCI boards) supported by the package. Many other types of parameters can be used.

Figure 6:
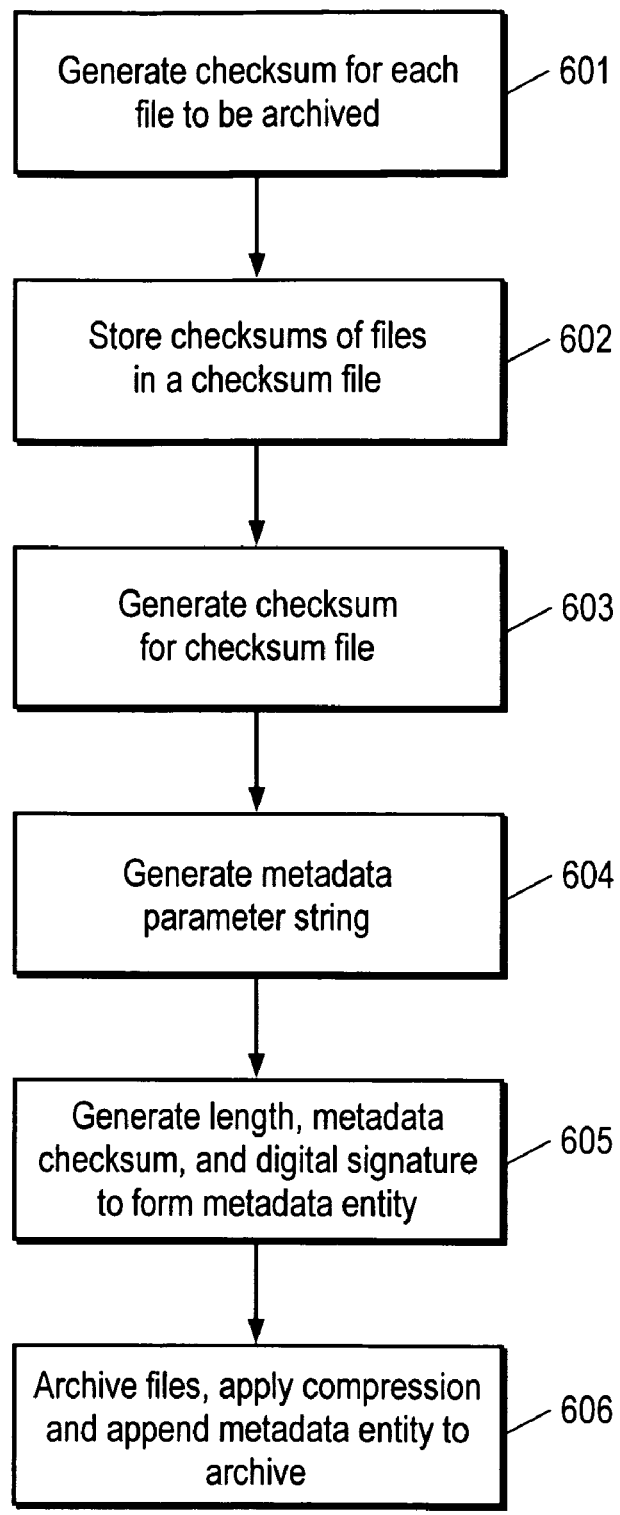
FIG. 6 is a flow diagram illustrating an example of the process of creating a download package.

Refer now to FIG. 6, which shows the overall process of creating a download package, according to an embodiment of the invention. The process is performed by a package creator, which can be in the form of one or more software programs that run on a computer, such as a computer operated by the manufacturer of the storage system. First, at block 601 the package creator iterates through all the files that will go in the archive to generate a checksum for each file. The checksums are then placed in a separate checksum file at block 602. Next, the package creator generates a checksum for the checksum file at block 603. The package creator then generates the metadata parameter string at block 604 in the manner described above. At block 605 the package creator then generates the checksum of the metadata entity, the length field, and digital signature, and combines these to form the metadata entity as described above with reference to FIG. 5. Finally, at block 606 the package creator archives the files and the checksum file (and, in some implementations, the metadata; see FIGS. 4B and 4C), and then applies compression. As noted above, there are various possible approaches to combining the metadata with the archived files and of applying compression (see FIGS. 4A, 4B and 4C). In one embodiment, as shown in FIG. 6, the package creator then appends the metadata entity to the compressed archive.

Figure 7:
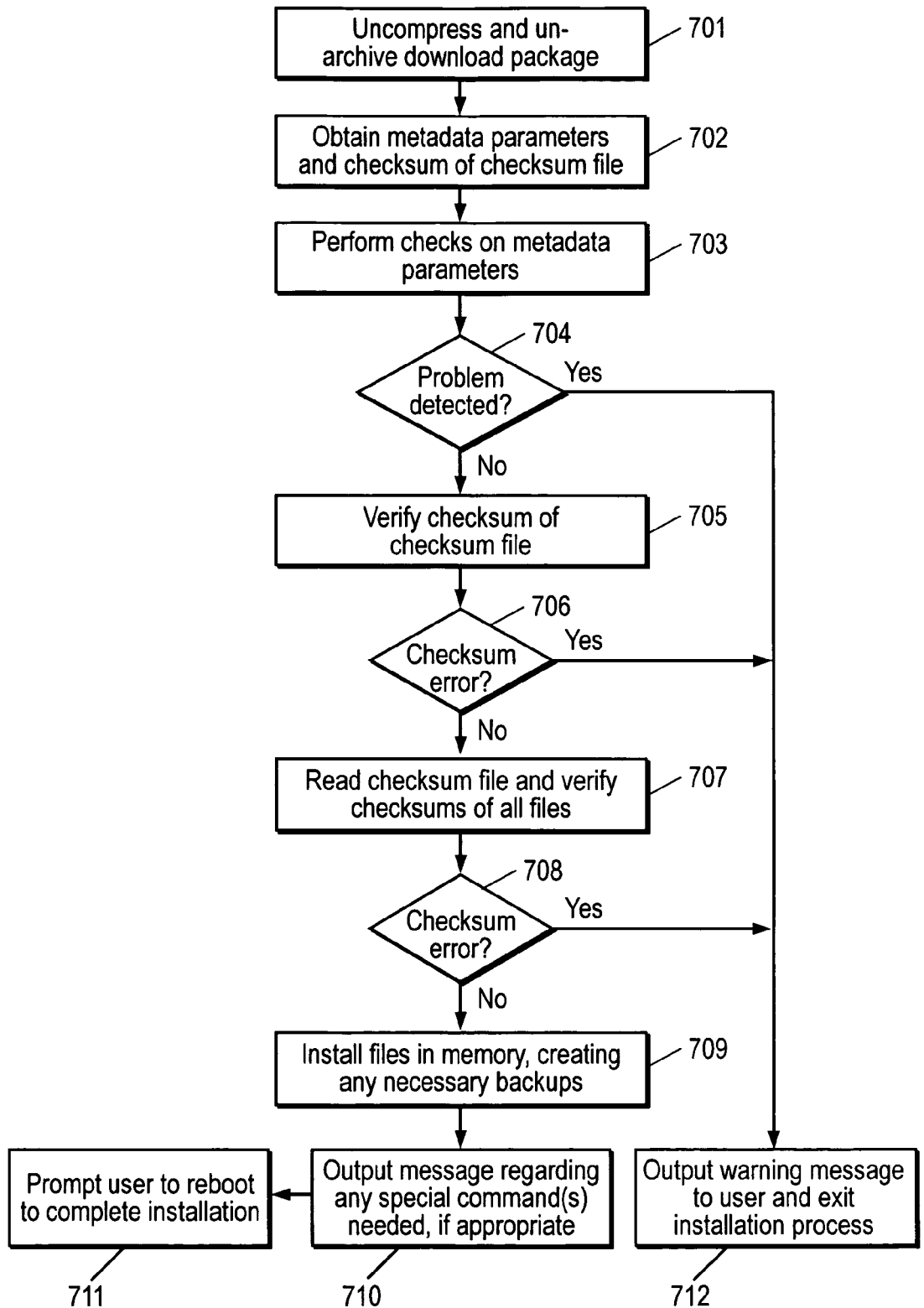
FIG. 7 is a flow diagram illustrating an example of the process performed by the installer.

FIG. 7 shows the installation process performed by the installer after a download package is received by the storage system, according to an embodiment of the invention. Initially, at block 701 the package is uncompressed and unarchived. Next, at block 702 the installer 38 calls the metadata retriever 39 to obtain the metadata parameters and the checksum of the checksum file. The installer 38 then performs various checks on the metadata parameters (including verifying the digital signature) at block 703. If the installer 38 identifies any problems from the metadata (block 704), the installer 38 outputs a warning message to the user and exits the installation process at block 712. If the checks of the metadata indicate no problems, the installer 38 next verifies the checksum of the checksum file at block 705. If the checksum of the checksum file is correct (block 706), the process proceeds with block 707; otherwise, the installer 38 outputs a warning message to the user and exits the installation process at block 712.

If the checksum of the checksum file is correct (block 706), the installer 38 sequentially passes through the checksum file at block 707, verifying the checksum of each file that was archived. If any error is encountered (block 708), the installer 38 outputs a warning message to the user and exits the installation process at block 712. If no error is encountered, the installer 38 then installs the files in nonvolatile memory in the storage system 2 at block 709 (e.g., in Compact Flash and/or on an internal hard drive), creating a backup copy of any previously installed versions of these files, if any. Otherwise, the installer 38 outputs a warning message to the user and exits the installation process at block 712. If any special user command is needed for the installation process (as determined from the metadata), the installer 38 then so indicates to the user at block 710. Finally, the installer 38 prompts the user to reboot the storage system 2 to complete installation process at block 711.

Figure 8:
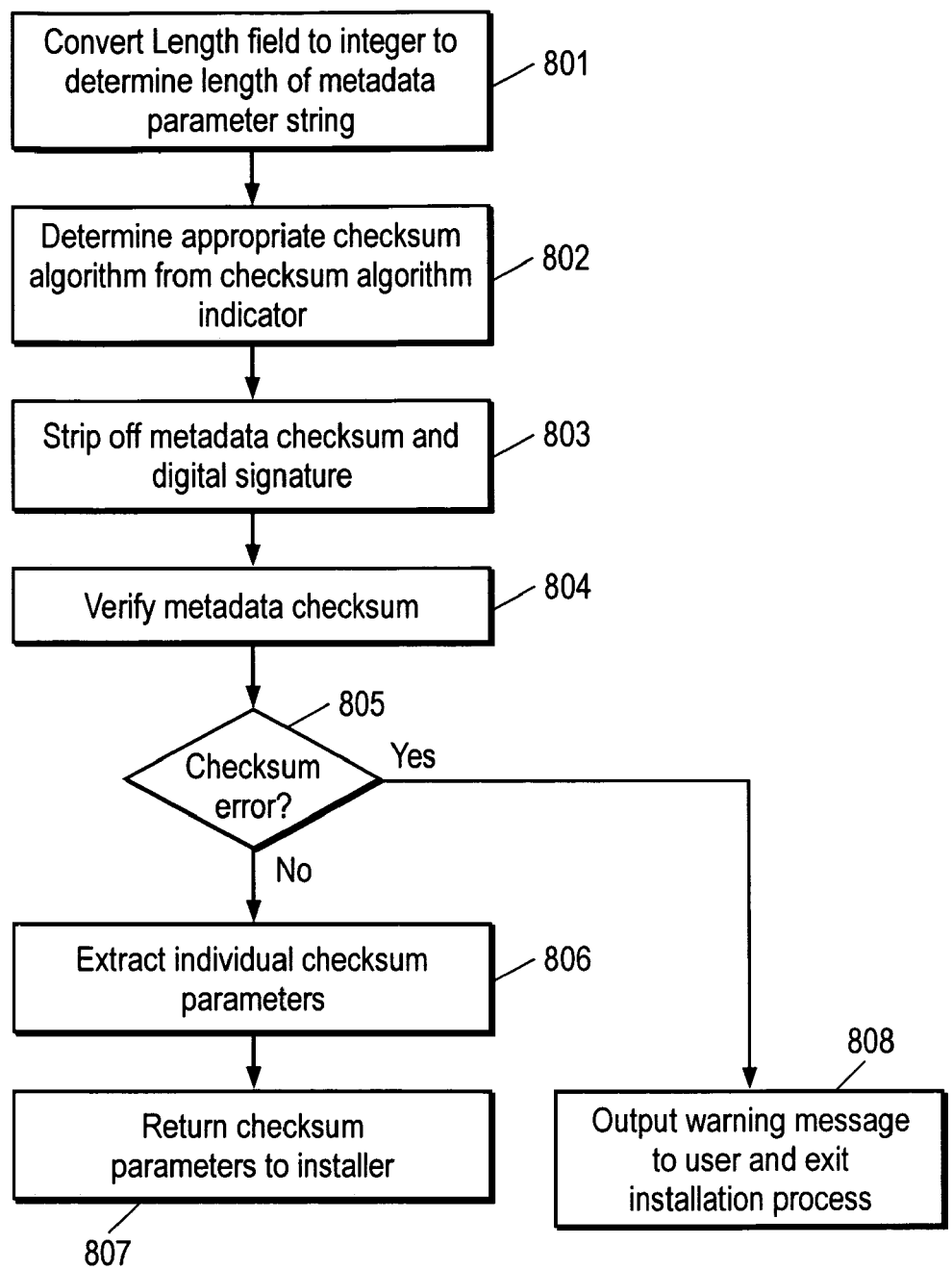
FIG. 8 is a flow diagram illustrating an example of the process performed by the metadata retriever.

FIG. 8 shows the process performed by the metadata retriever 38, according to an embodiment of the invention. The metadata retriever 38 is preconfigured to know the format of the download package and the metadata entity therein, i.e., to know that the first n bytes of the metadata entity are the length field, the next byte is the checksum algorithm indicator, the immediately following bytes are the metadata parameter string, etc. Initially, at block 801 the metadata retriever 38 converts the length field 52 (see FIG. 5) into an integer. As noted above, the length field 52 denotes the length of the metadata parameter string 54. The byte immediately following the length field 52 is the checksum algorithm indicator 53, which is next examined at block 802 to determine the appropriate checksum algorithm to use. Depending on the checksum algorithm, the corresponding number of bytes at the end of the metadata parameter string are then stripped off at block 803 (the stripped off portion includes the metadata checksum and the digital signature). The checksum of the metadata is then verified at block 804 using the selected algorithm. If the checksum is verified (block 805), the metadata is correct. In that case the metadata retriever 38 extracts the individual metadata parameters from the metadata parameter string at block 806 (for example, by using the C library call, "strtok( )") and returns the results to the installer 38 at block 807. In the event a checksum error is detected (block 805), the metadata retriever 39 outputs a warning message to the user and exits the installation process at block 808.

Thus, a method and apparatus for modifying the software configuration of a storage system have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   receiving a download package at a storage system via a network connection, the download package for use in performing a software installation process in the storage system, the download package including an archive of files and a metadata entity appended to the archive of files, the metadata entity including a first set of metadata; and
   using the first set of metadata in the storage system to perform a set of preliminary checks for the software installation process.

2. A method as recited in claim 1, further comprising executing the software installation process in the storage system after performing the set of preliminary checks.

3. A method as recited in claim 1, wherein in the download package the archive is compressed and the metadata entity is appended to the compressed archive, the method further comprising decompressing the archive after said receiving the download package and prior to initiation of the software installation process.

4. A method as recited in claim 1, wherein the metadata entity further includes a metadata checksum, the method further comprising:
   using the metadata checksum to confirm the integrity of the metadata entity.

5. A method as recited in claim 1, wherein the metadata entity further includes a checksum algorithm field, the method further comprising:
   using the checksum algorithm field to determine an appropriate algorithm to use in evaluating the metadata checksum.

6. A method as recited in claim 1, wherein the metadata entity includes a digital signature, the method further comprising:
   using the digital signature to authenticate the download package, prior to initiation of the software installation process.

7. A method as recited in claim 1, wherein the archive includes a plurality of files and a checksum file, the method further comprising:
   using the checksum file to verify the integrity of each of the plurality of files.

8. A method as recited in claim 7, wherein the metadata entity includes a checksum of the checksum file; the method further comprising:
   using the checksum of the checksum file to confirm the integrity of the checksum file.

9. A method as recited in claim 1, wherein the archive includes a second set of metadata relating to the files in the archive, the method further comprising:

using the second set of metadata in the software installation process in the storage system.

10. A method as recited in claim 9, wherein the first set of metadata is used by an installer in the storage system only if the installer is at least as current as a specified version, and wherein the second set of metadata is used by the installer if the installer is older than the specified version.

11. A method as recited in claim 1, wherein the first set of metadata includes an indication of one or more particular models of storage system supported by the plurality of files supported.

12. A method as recited in claim 1, wherein the first set of metadata includes an indication of one or more hardware adapters supported by the plurality of files supported.

13. A method of updating software in a storage server, the method comprising:
receiving a download package at the storage server over a network, the download package including a compressed archive and a metadata entity appended to the compressed archive, the compressed archive including a plurality of files and a checksum file, the metadata entity including a first set of metadata, a metadata checksum, a checksum of the checksum file, and a checksum algorithm field;
decompressing the archive and extracting the plurality of files from the archive;
reading the checksum algorithm field to identify a checksum algorithm;
applying the checksum algorithm to the metadata checksum to confirm the integrity of the metadata entity;
using the checksum of the checksum file to confirm the integrity of the checksum file;
using the first set of metadata in the storage server to perform a set of preliminary checks for a software installation process;
using the checksum file to verify the integrity of each of the plurality of files; and
executing the software installation process to modify a software configuration of the storage server, based on the plurality of files.

14. A method as recited in claim 13, wherein the compressed archive further includes a second set of metadata relating to the plurality of files, the method further comprising:
using the second set of metadata in the software installation process in the storage server.

15. A method as recited in claim 14, wherein the first set of metadata is used by an installer in the storage server only if the installer is at least as current as a specified version, and wherein the second set of metadata is used by the installer if the installer is older than the specified version.

16. A method as recited in claim 13, wherein the metadata entity includes a digital signature, the method further comprising using the digital signature to authenticate the download package, prior to initiation of the software installation process.

17. A method as recited in claim 13, wherein the first set of metadata includes an indication of one or more particular models of storage system supported by the plurality of files supported.

18. A method as recited in claim 13, wherein the first set of metadata includes an indication of one or more hardware adapters supported by the plurality of files supported.

19. A storage server comprising:
a processor;
a communication interface through which to communicate with a client;
a storage interface through which to access an array of mass storage devices;
an operating system, for use by the processor, to enable the storage server to service a request from the client to access data stored in the array of storage devices, the operating system including an installer to
receive a download package sent over a network, the download package including an archive and a metadata entity appended to the archive, the archive including a plurality of files which are to be installed in the storage server and a checksum file, the metadata entity including a first set of metadata relating to the plurality of files; and
use the first set of metadata in the storage server to perform a set of preliminary checks for a software installation process.

20. A storage server as recited in claim 19, wherein the archive includes a second set of metadata relating to the plurality of files, and wherein the installer further is to:
use the second set of metadata in the software installation process.

21. A storage server as recited in claim 20, wherein the installer uses the first set of metadata only if the installer is at least as current as a specified version, and wherein the installer uses the second set of metadata if the installer is older than the specified version.

22. A storage server as recited in claim 19, wherein in the download package the archive is compressed and the metadata entity is appended to the compressed archive, and wherein the installer further is to decompress the archive prior to initiation of the software installation process.

23. A storage server as recited in claim 19, wherein the metadata entity includes a checksum of the checksum file; and wherein the installer further is to:
use the checksum of the checksum file to confirm the integrity of the checksum file.

24. A storage server as recited in claim 23, wherein the metadata entity further includes a metadata checksum, and wherein the installer further is to:
use the metadata checksum to confirm the integrity of the metadata entity.

25. A storage server as recited in claim 24, wherein the metadata entity further includes a checksum algorithm field, and wherein the installer further is to:
read the checksum algorithm field to determine an appropriate algorithm to use in evaluating the metadata checksum.

26. A storage server as recited in claim 19, wherein the metadata entity includes a digital signature, and wherein the installer further is to:
use the digital signature to authenticate the download package, prior to initiation of the software installation process.

27. A storage server as recited in claim 19, wherein the first set of metadata includes an indication of one or more particular models of storage system supported by the plurality of files supported.

28. A storage server as recited in claim 19, wherein the first set of metadata includes an indication of one or more hardware adapters supported by the plurality of files supported.

29. A storage system comprising:
means for receiving a download package over a network, the download package including an archive and a metadata entity appended to the archive, the archive including a plurality of files for use in performing a software installation process in the storage system, the metadata entity including a first set of metadata; and means for using the first set of metadata in the storage system to perform a set of preliminary checks for the software installation process.

30. A method of creating a download package for use in updating software in a storage System over a network, the method comprising:
- generating a first set of metadata relating to a plurality of, files which are to be installed in a storage system, the first set of metadata to be read by an installer in the storage system prior to installing the plurality of files and for use by the installer to install the plurality of files in the storage system;
- storing the plurality of files and a checksum file in an archive, the checksum file containing a checksum for each of the plurality of files;
- appending a metadata entity which contains the first set of metadata to the archive to form the download package; and
- using the first set of metadata in the storage system to perform a set of preliminary checks for a software installation process.

31. A method as recited in claim 30, further comprising:
storing in the archive a second set of metadata relating to the plurality of files, the second set of metadata for use by the installer in installing the plurality of files in the storage system.

32. A method as recited in claim 31, wherein the first set of metadata is for use by the installer only if the installer is at least as current as a specified version, and wherein the second set of metadata is for use by the installer if the installer is older than the specified version.

33. A method as recited in claim 30, further comprising compressing the archive prior to appending the metadata entity to the archive.

34. A method as recited in claim 30, further comprising compressing the archive and the metadata entity together after appending the first set of metadata to the archive.

35. A method as recited in claim 30, further comprising:
generating a checksum of the checksum file, for use by the installer in confirming the integrity of the checksum file; and
including the checksum of the checksum file in the first metadata entity.

36. A method as recited in claim 35, further comprising:
generating a metadata checksum, for use by the installer in confirming the integrity of the checksum metadata entity; and
including the metadata checksum in the metadata entity.

37. A method as recited in claim 36, further comprising:
including in the metadata entity a checksum algorithm field indicating a checksum algorithm to be used in evaluating the metadata checksum.

38. A method as recited in claim 30, further comprising:
including in the metadata entity a digital signature for use in authenticating the download package.

39. A method as recited in claim 30, wherein the first set of metadata includes an indication of one or more particular models of storage system supported by the plurality of files supported.

40. A method as recited in claim 30, wherein the first set of metadata includes an indication of one or more hardware adapters supported by the plurality of files supported.

* * * * *